Inventor:
Herbert W. Molzahn
John J. Konak Atty.

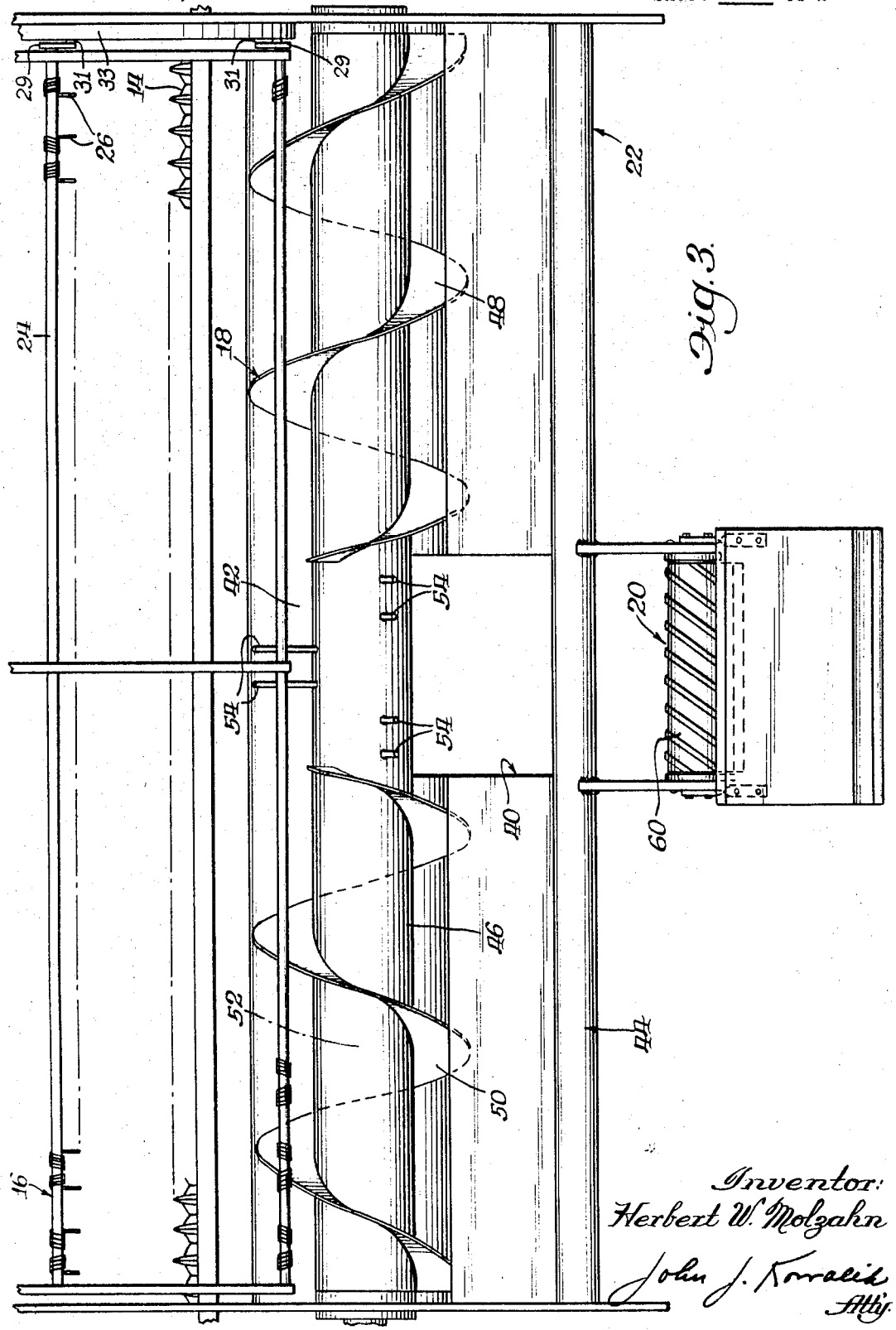

United States Patent Office 3,451,199
Patented June 24, 1969

3,451,199
WINDROWER
Herbert W. Molzahn, Hamilton, Ontario, Canada, assignor to International Harvester Company, a corporation of Delaware
Filed Mar. 2, 1966, Ser. No. 531,186
Int. Cl. A01d 43/00
U.S. Cl. 56—23                              6 Claims

ABSTRACT OF THE DISCLOSURE

A self-propelled windrower having a harvester platform for cutting a crop and conveying the crop through a crop discharge area onto the ground in a windrow. A reel and an auger are mounted on the platform in peripherally upwardly converging relation for lifting the cut crop upwardly therebetween and for depositing the crop onto the upper portion of the auger. The reel includes tines which are resilient to accommodate the crop moving upwardly between the reel and the auger and effective to spring rearwardly above the auger to cast the crop onto the upper portion of the auger. The auger includes pick-up fingers for insuring positive flow of the crop over the auger into the discharge area.

---

The present invention relates to a windrower.

The invention has to do with that kind of windrower which includes a transverse cutter, reel means for conveying the crop after it is cut rearwardly onto the platform of the windrower, and auger means for congregation the cut crop toward the center of the platform where it drops through an opening in the platform and deposits upon the ground in a windrow.

A broad object of the invention is to provide a platform windrower of the foregoing general character having novel construction utilizing a single overshot auger for conveying the crop.

Another object is to provide a platform windrower of the foregoing general character having a novel arrangement in which the reel coacts with the auger in an effective manner for transmitting the cut crop over the auger.

Still another object is to provide a platform windrower having a single auger with flights at the ends and a space in the center in which fingers are provided for discharging the crop advanced by the augers over the auger and into the windrow.

An additional object is to provide a platform windrower including a novel arrangement of hay conditioner rolls for conditioning the cut crop as it is deposited in the windrow on the ground.

Still another object is to provide a platform windrower having conditioner rolls of the character just referred to, in which the conditioner rolls are mounted for movement independently of the remainder of the windrower whereby they can follow the contour of the ground independently of the remaining operating elements of the windrower, and further in which the conditioner rolls can be moved to an inoperative position for enabling the cut crop to be deposited in the windrow without being conditioned.

Other objects and advantages of the invention will appear from the followng detail description taken in conjunction with the accompanying drawings in which—

FIGURE 3 is a plan view of the principal portion of the windrower.

Figure 1:
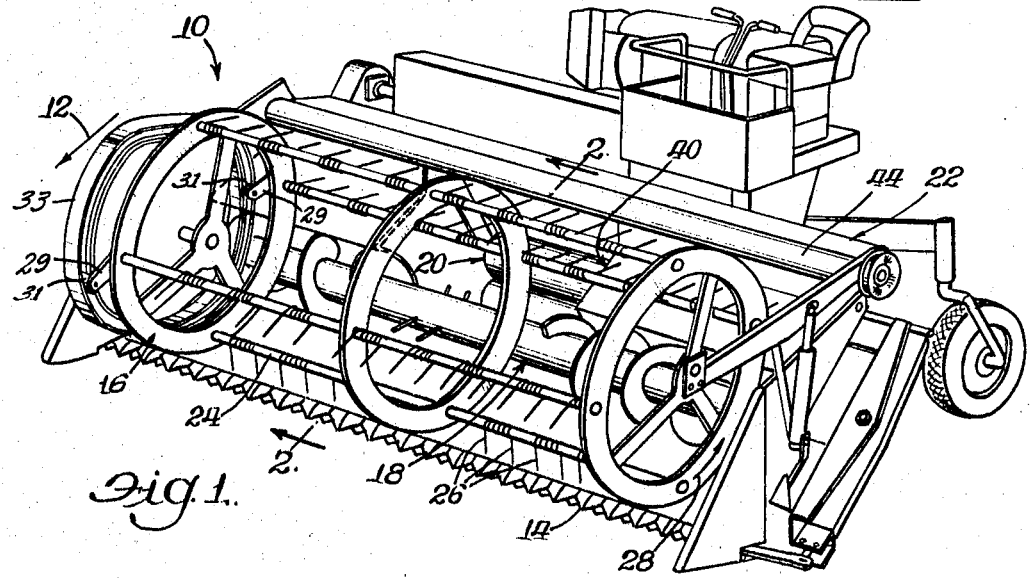
FIGURE 1 is a perspective view of a windrower embodying the features of the present invention, showing the principal components thereof.
Figure 2:
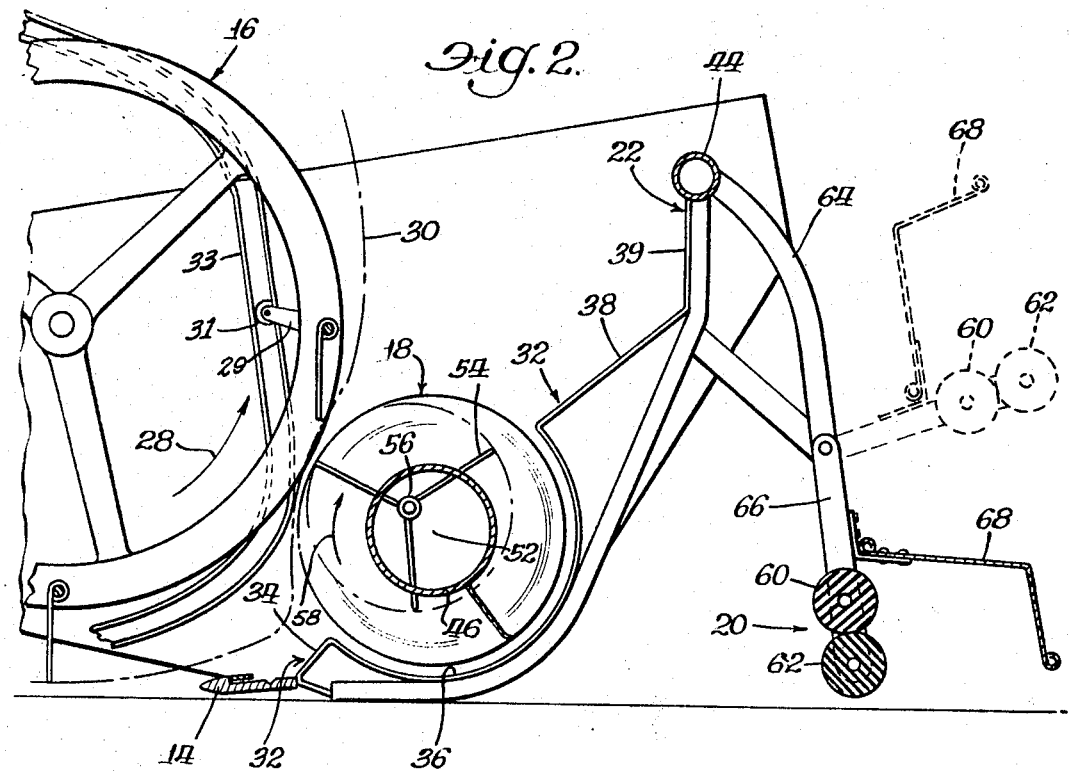
FIGURE 2 is a central longitudinal fore-and-aft sectional view taken at line 2—2 of FIGURE 1.

Referring now in detail to the drawings, the windrower is indicated in its entirety at 10, arranged to travel to the left as viewed in FIGURES 1 and 2 and away from the observer as FIGURE 3, in the normal operation of the apparatus, as indicated by the arrow 12. Principal components incorporated in the windrower include a cutter or knife 14, a reel 16 and an auger 18. Also included in the apparatus is a hay conditioner 20 arranged for selective use. In the normal operation of the apparatus, the crop, such as hay, is cut by the cutter or knife 14, and then worked rearwardly by the reel 16 onto the auger 18 which in turn continues to advance the crop somewhat rearwardly but mostly toward the middle where it is moved through an opening in the platform and onto the ground in the form of a windrow. When the hay conditioner 20 is in position for operation, the crop is conditioned, but when it is raised to inoperative position the cut crop is not given any conditioning treatment. Further details of the foregoing will be given hereinbelow.

The windrower includes a frame 22 which may be of any suitable kind and includes elements for supporting the various components mentioned above. The cutter or knife 14 extends transversely across the full effective width of the windrower and is positioned close to the ground in the normal operation of the device. This cutter or knife may be of any suitable kind such as a sickle as here shown. Closely cooperating with the cutter or knife is the reel 16 which of itself is of known kind. The reel includes a plurality of circumferentially spaced, transversely extending bars 24 each having a plurality of resilient tines 26 thereon. The reel is of cam-operated type, functioning so that the tines extend in predetermined directions throughout the rotation of the reel which is in counterclockwise direction as viewed in FIGURES 1 and 2 and indicated by the arrow 28. A crank arm 29 is fixed to one end of each bar 24 and has a roller 31 disposed within a transversely U-shaped cam track 33 mounted on a side wall of the platform. Specifically, the tines 26 are held in downward direction at the bottom and continue substantially in that same direction throughout a portion of the travel of the reel until they pass beyond the auger 18. The dot-dash lie 30 indicates the path of the extended ends of the tines. Upon rotation of the reel as stated, the tines at the bottom thereof extend into close proximity to the ground and move rearwardly toward the cutter or knife. The tines at this position thus work the crop toward the cutter or knife wihle it is still standing and after it is cut by the latter the tines continue a slight distance beyond the knife and then move upwardly into close proximity to the auger 18 as shown, and as referred to again hereinbelow. As best seen in FIGURE 2, the peripheries of the reel and auger converge upwardly toward each other defining a zone through which the crop is lifted upwardly. It will be noted that throughout the travel of the tines past the auger, they continue to extend downwardly, enabling the cut crop to slide downwardly therefrom without being snagged thereby. After the tines pass the auger they may then swing outwardly somewhat as indicated by the line 30 which at that point diverges from the path of the bars 24. The resiliency of the tines enables them to spring forwardly in response to the load imposed thereon by the upwardly moving crop and to then spring rearwardly above the auger to thrust the crop rearwardly onto the upper portion of the auger as the tines move out of engagement with the crop.

The cutter or knife 14 is mounted on the leading edge of a platform 32 which includes a front deck 34, a trough 36 and a rear deck 38 which merges into a back sheet 39. The front deck and rear deck together lie in or adjacent a common plane sloping upwardly to the rear and between which the trough is disposed. The trough receives the auger and is of such dimensions that the auger is substantially one-half enclosed therein. The rear portion of the trough and the upper deck are interrupted at substantially the center to form an opening 40 through which the cut crop passes in the windrowing operation. The lower portion of the platform may include an element 42 forming a continuation of the front deck 34 and continuing transversely across the platform, i.e., across the opening 40 as well. The frame may include a cross member 44 at the rear and adjacent the top for supporting portions of the platform as well as other members.

The auger 18 in itself may be of known kind having a tubular core 46 and flights 48 and 50, the latter being disposed on opposite sides of the opening 40 and arranged as right and left flights respectively for working the cut crop inwardly toward the middle and through the opening. The axis of rotation of the auger is indicated at 52.

The auger is provided with a plurality of radiating pickup or discharge fingers 54 mounted on a shaft 56 disposed within the core 46 and mounted eccentric to the axis 52 of the auger. These fingers are disposed at the middle of the auger, in the center void between the flights thereof, and extend through the wall of the core and swing or rotate around the axis of the shaft 56, thus projecting through openings in the core wall and retracting therefrom in a known manner. The auger, with the fingers, rotates in a direction opposite that of the reel, as indicated by the arrow 58, and thus the auger and the reel at their points of closest proximity travel peripherally in similar directions for working the cut crop upwardly.

As the crop is cut, the tines in the reel work the cut crop upwardly over the auger. The auger provides a certain degree of upward movement to the cut crop which moves up the rear deck 38 and up to and onto the back sheet 39. The auger also of course works the cut crop inwardly from each end and as the crop thus is worked into the middle it drops through the opening 40 in the platform and falls onto the ground in the form of a windrow. The discharge fingers 54 are arranged so that they are retracted to their innermost position adjacent the bottom, preferably in approximately a five-o'clock position (FIGURE 2), and are progressively projected as the fingers move upwardly on the front side to a maximum projected position at approximately an eleven-o'clock position. These fingers thus aid in carrying the cut crop over the core of the auger at the central void thereof. The foregoing operation of the auger and its cooperation with the reel are in distinct contrast to most previously known arrangements in which the cut crop is worked under the auger and compressed thereby.

Although the retractable fingers 54 are desired, it is nevertheless within the scope of the invention to utilize non-retractable fingers.

The hay conditioner 20 may be of suitable kind, having a pair of rolls 60 and 62 mounted for rotation for receiving the cut crop, such as hay, between the rolls. The rolls are mounted on a suitable frame extension 64 itself included in the frame 22, and swinging arms 66 directly supporting the rolls. A windrow forming shield 68 is provided and if desired it may be mounted on the arms 66. The arms 66 are mounted for swinging movement on the frame extension 64 between a lower operative position shown in full lines and an upper inoperative position shown in dot-dash lines. Such hay conditioner and its function are known, but there are instances in which it is desired that the hay not be conditioned, such as in the case of seed crops. In the latter case, the rolls may be swung up into their inoperative position in the manner shown. The hay conditioner 20 is preferably mounted for limited yielding movement to follow the ground independently of the other components of the windrower. For example, the cutter or knife 14 may work or yield vertically but due to the distance between that component and the conditioner, in the direction of movement of the windrower, the latter may yield at different times than the cutter or knife.

The conditioner is mounted for normal positioning close to but spaced from the ground so that the lower roll 62 thereof follows along adjacent the upper end of the stubble, and as the cut crop falls through the opening 40 it is picked up and worked between the rolls as it approaches the ground without its actually being deposited directly thereon so that the conditioning is in effect a continuation of the windrowing operation, and the crop as it leaves the conditioner is deposited onto the ground in a fluffy state in the form of a windrow. The crop is ejected rearwardly by the rolls toward the shield 68 and some of it actually into engagement with that shield, the shield assisting in forming the crop into the desired windrow.

The reel 16, the auger 18, and the conditioner 20 may be driven by any suitable means in a known manner, such as by the power take-off of the tractor driving the windrower, having for example pulleys thereon for receiving driving belts in a known manner, not shown here.

I claim:

1. A windrower adapted for moving in a predetermined direction in its normal operation, said windrower including a harvester platform having a leading edge and a crop discharge area, a cutter extending along the leading edge of said platform, a single auger extending across said platform rearwardly of said cutter generally parallel thereto, said auger having flighting extending toward said discharge area, said auger being rotated in such direction that its forward portion moves upwardly and its upper portion moves rearwardly and said flighting works toward said discharge area, and a reel extending across said platform generally forwardly and above said cutter, said reel being rotated in a direction opposite that of said auger, said reel including peripheral spring-like tooth elements movable close to the ground and engageable with the crop being cut and over the cutter and toward said auger, said reel and said forward portion of said auger defining a zone of upward convergence wherein said elements and said forward portion of said auger move upwardly to lift the crop therebetween and wherein said elements are loaded by the crop, said elements being effective by springing rearwardly above said zone to thrust the crop rearwardly onto the upper portion of said auger for conveyance thereby toward said crop discharge area.

2. The subject matter of claim 1, wherein said flighting terminates on said auger leaving a void aligned with said crop discharge area, said auger having fingers disposed in said void and being operative to lift the cut crop upwardly and rearwardly over said auger toward said discharge area.

3. The subject matter of claim 2, wherein said auger includes a shaft mounted therein eccentric to the axis of rotation of said auger, said fingers being mounted on said shaft for movement progressively outwardly and inwardly in response to rotation of said auger between a retracted position adjacent to the bottom of said auger and a projected position adjacent to the top thereof.

4. A windrower adapted for moving in a predetermined direction in its normal operation, said windrower including a harvester platform having a crop discharge opening defined centrally therethrough, a cutter extending along the leading edge of said platform, a single auger extending across said platform rearwardly of said cutter generally parallel thereto, said auger having flights extending from the ends inwardly, said auger being rotated in such direction that its forward portion moves upwardly and its upper portion moves rearwardly and said flights work from the outer ends inwardly toward said crop discharge opening, and a reel extending across said platform generally forwardly and above said cutter, said reel being rotated in a direction opposite that of said auger, said reel including peripheral elements movable close to the ground and engageable with the crop being cut and thereafter movable in a path closely adjacent to said auger, said reel and said auger defining a zone of convergence wherein said elements and said forward portion of said auger move upwardly to move the cut crop upwardly therebetween through said zone, said elements being resilient for springing forwardly to accommodate the crop moving upwardly through said zone and effective upon moving above said zone to spring rearwardly to move the crop rearwardly onto the upper portion of said auger, said reel including cam means for controlling said elements so that said elements extend generally vertically throughout movement over said cutter and upwardly through said zone and thereafter slope rearwardly over said auger for positively moving the cut crop onto said auger.

5. The subject matter of claim 4, wherein said flights terminate at spaced positions defining a void in alignment with said crop discharge opening, said auger having fingers disposed in said void and being operative to lift cut crop upwardly and rearwardly over said auger toward said opening.

6. The subject matter of claim 5, wherein said auger includes a shaft mounted therein eccentric to the axis of rotation of said auger, said fingers being mounted on said shaft for movement progressively outwardly and inwardly in response to rotation of said auger between a retracted position adjacent to the bottom of said auger and a projected position adjacent to the top thereof.

References Cited
UNITED STATES PATENTS

| | | | |
|---|---|---|---|
| 45,597 | 12/1864 | Fox et al. | 56—158 |
| 2,529,180 | 11/1950 | Oehler. | |
| 3,060,665 | 10/1962 | Escher | 56—21 |
| 3,241,300 | 3/1966 | Fell et al. | 56—1 |
| 3,241,301 | 3/1966 | Dyrdahl | 56—23 |
| 3,118,265 | 1/1964 | Shaver | 56—23 |
| 3,363,407 | 1/1968 | Drummond | 56—23 |

HUGH R. CHAMBLEE, *Primary Examiner.*

U.S. Cl. X.R.

56—1